United States Patent
Alkhatib et al.

(10) Patent No.: US 12,216,642 B2
(45) Date of Patent: Feb. 4, 2025

(54) SYSTEM AND METHOD FOR PERFORMING ONLINE ARCHIVING OPERATIONS

(71) Applicant: MongoDB, Inc., New York, NY (US)

(72) Inventors: Abdullah Alkhatib, Union City, CA (US); Robert Liles, New York, NY (US); Pia Kochar, Bethesda, MD (US)

(73) Assignee: MongoDB, Inc., New York, NY (US)

( * ) Notice: Subject to any disclaimer, the term of this patent is extended or adjusted under 35 U.S.C. 154(b) by 63 days.

(21) Appl. No.: 17/341,896

(22) Filed: Jun. 8, 2021

(65) Prior Publication Data

US 2021/0382874 A1    Dec. 9, 2021

Related U.S. Application Data

(60) Provisional application No. 63/036,134, filed on Jun. 8, 2020.

(51) Int. Cl.
*G06F 16/27* (2019.01)
*G06F 16/11* (2019.01)
*G06F 16/23* (2019.01)
*G06F 16/2458* (2019.01)
*G06F 16/25* (2019.01)

(52) U.S. Cl.
CPC ........ *G06F 16/2379* (2019.01); *G06F 16/113* (2019.01); *G06F 16/2471* (2019.01); *G06F 16/25* (2019.01); *G06F 16/27* (2019.01); *G06F 16/2372* (2019.01)

(58) Field of Classification Search
CPC ........ G06F 16/23; G06F 16/25; G06F 16/113; G06F 16/2379; G06F 16/2471; G06F 16/243; G06F 16/27; G06F 11/1471
See application file for complete search history.

(56) References Cited

U.S. PATENT DOCUMENTS

| | | | |
|---|---|---|---|
| 10,223,184 B1 * | 3/2019 | McKelvie | G06F 3/0659 |
| 10,838,926 B2 * | 11/2020 | Bensberg | G06F 16/21 |
| 2020/0233600 A1 * | 7/2020 | Swamy | G06F 3/067 |
| 2020/0286100 A1 * | 9/2020 | Zhou | G06Q 30/016 |
| 2020/0293577 A1 * | 9/2020 | Greetham | G06F 16/93 |

* cited by examiner

*Primary Examiner* — Marcin R Filipczyk
(74) *Attorney, Agent, or Firm* — Wolf, Greenfield & Sacks, P.C.

(57) ABSTRACT

According to at least one aspect, a distributed database system is provided. In some implementations, the distributed system comprises an online database, an archive database, and a data processing entity adapted to receive a query of a single logical database, the single logical database being stored across the online database and offline database. In some examples, the data processing entity archives data from the online database to the offline database responsive to one or more archive rules.

20 Claims, 13 Drawing Sheets

SYSTEM AND METHOD FOR PERFORMING ONLINE ARCHIVING OPERATIONS

RELATED APPLICATIONS

This application is a Non-Provisional of Provisional (35 USC 119(e)) of U.S. Application Ser. No. 63/036,134 filed Jun. 8, 2020, entitled "SYSTEM AND METHOD FOR PERFORMING ONLINE ARCHIVING OPERATIONS" to which priority is claimed. The entire contents of this application is incorporated herein by reference in its entirety.

BACKGROUND

There are many different database architectures and methods for storing and retrieving data. With the ever-growing amount of data being generated, it is a constant issue for managing and storing data in a more efficient manner.

SUMMARY

It is appreciated that more efficient methods and systems are desired for managing database data within a database service environment. In some aspects, an online managed database architecture is provided that is capable of automatically archiving data to offline storage, while the online database is operational. Notably, it is appreciated that offline storage systems may be used to satisfy read operations. In some embodiments, a single access point is provided (e.g., to systems, applications, etc.) to provide read access to data stored within the online and offline storage locations. In some embodiments, the online database is architected as a cloud-based database service (e.g., Database-as-a-Service (DaaS)) such as provided by the ATLAS database system available commercially from MongoDB. Such an online database may be constructed using, for example, a cluster architecture having primary and secondary nodes which coordinate to store and manage data, and may be accessed by systems and users via one or more networks.

The system may also employ offline storage such as those provided by one or more cloud-based storage providers or other systems. For instance, data may be stored in one or more cloud-based storage services such as AWS, Azure, or GCP. In some implementations, the system automatically archives data within data buckets. For instance, data may be stored in the well-known Amazon Web Services' (AWS) Simple Storage Service (S3), a cloud-based object storage service. Amazon S3 buckets, which are similar to file folders, store objects, that include data and its descriptive metadata. These data buckets are managed via the online database management system (e.g., by an ATLAS database system and associated cluster nodes). It should be appreciated, however, that other similar cloud-based services may be used to implement archive storage.

In some embodiments, the system is configured to create a read-only unified view within the database service which is capable of fulfilling database reads by one or more systems (e.g., client applications, entities, other systems, etc.). In some implementations, the unified view provides real-time access for querying both online and offline storage.

In some embodiments, controls are provided to permit users to control how data is archived. For instance, a control may be provided (e.g., via a management interface) that permits a database administrator or other user type to create archives on particular database namespaces. In some embodiments, administrators or other users are provided controls that can be used to define one or more archive rules. These archive rules may determine what data gets destaged to offline storage. For example, data that is not frequently accessed may be automatically archived to offline storage, which can free storage space in online data stores, which makes operation of the online portion more efficient. Further, by automatically archiving data that is not frequently accessed, performance of the online database is improved. Also, it is appreciated that the use of offline data storage may be used to make operations less costly in a cloud-based architecture. Further, read operations may be performed in parallel from both online and offline storage to improve read performance.

According to some aspects, a distributed system is provided comprising an online database, an archive database, and a data processing entity adapted to receive a query of a single logical database, the single logical database being stored across the online database and offline database. In some embodiments, the online database comprises a data lake architecture adapted to store a plurality of unstructured data entities. In some embodiments, the query is a single unified query of the data being stored across the online database and offline database.

In some embodiments, the online database is stored within a cluster of nodes. In some embodiments, the archive database is stored within cloud-based storage entities. In some embodiments, the system further comprises a processing entity configured to create read-only views of storage relating to the online database and the archive database. In some embodiments, the processing entity includes an archive management entity adapted to receive a query from one or more systems and to distribute the query to one or more systems associated with the online database and offline database.

In some embodiments, the system further comprises a memory configured to store one or more archive rules that control archiving of data from the online database to the archive database. In some embodiments, the processing entity performs archiving operations in real time while performing database operations across the online database and offline database. In some embodiments, at least one of the one or more archive rules is configured to archive data based on a date field. In some embodiments, at least one of the one or more archive rules is configured to archive data based on a non-date field. In some embodiments, at least one of the one or more archive rules is configurable by a user. In some embodiments, at least one of the one or more archive rules is configured to archive data based on a plurality of data fields. In some embodiments, the archive database includes at least one partition, the at least one partition including archive data determined by one or more data fields. In some embodiments, at least one of the one or more archive rules is configured to archive data based on a date field.

In some aspects, a method is provided comprising acts of maintaining an online database, maintaining an offline database, the online database and offline database representing a single database identified by a namespace, and providing a single access point for performing one or more data operations on elements of the online and offline database. In some embodiments, the method further comprises an act of processing, by a database management entity, a write request that updates a data element located in offline storage. In some embodiments, the act of processing the write request includes unarchiving the data element to online storage.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

As discussed, various aspects relate to automatic archival of data in database systems. In some embodiments, a capability is provided (e.g., in an online database system), that automatically archives data from an online database to offline data storage (e.g., to a cloud-based storage location). In some embodiments, it is appreciated that online database storage and performance may be improved if primary data storage usage can be adjusted in real time. Data from online storage may be transferred to offline storage (e.g., based on one or more archive rules). This feature, in some implementation, may allow architects of applications and systems using the database architecture to automatically archive their data from an online-type database (e.g., a DaaS system such as ATLAS cluster commercially available from MongoDB) into one or more cloud-based storage entities (e.g., one or more S3 buckets). In some embodiments, various aspects discussed herein may be implemented within a data lake. In addition, a read-only unified view of their data may be created in the online and offline databases. In some embodiments, the data lake performs a union of the online and offline data collections into a virtual collection. The data lake permits queries across the combined virtual collection.

Figure 1:
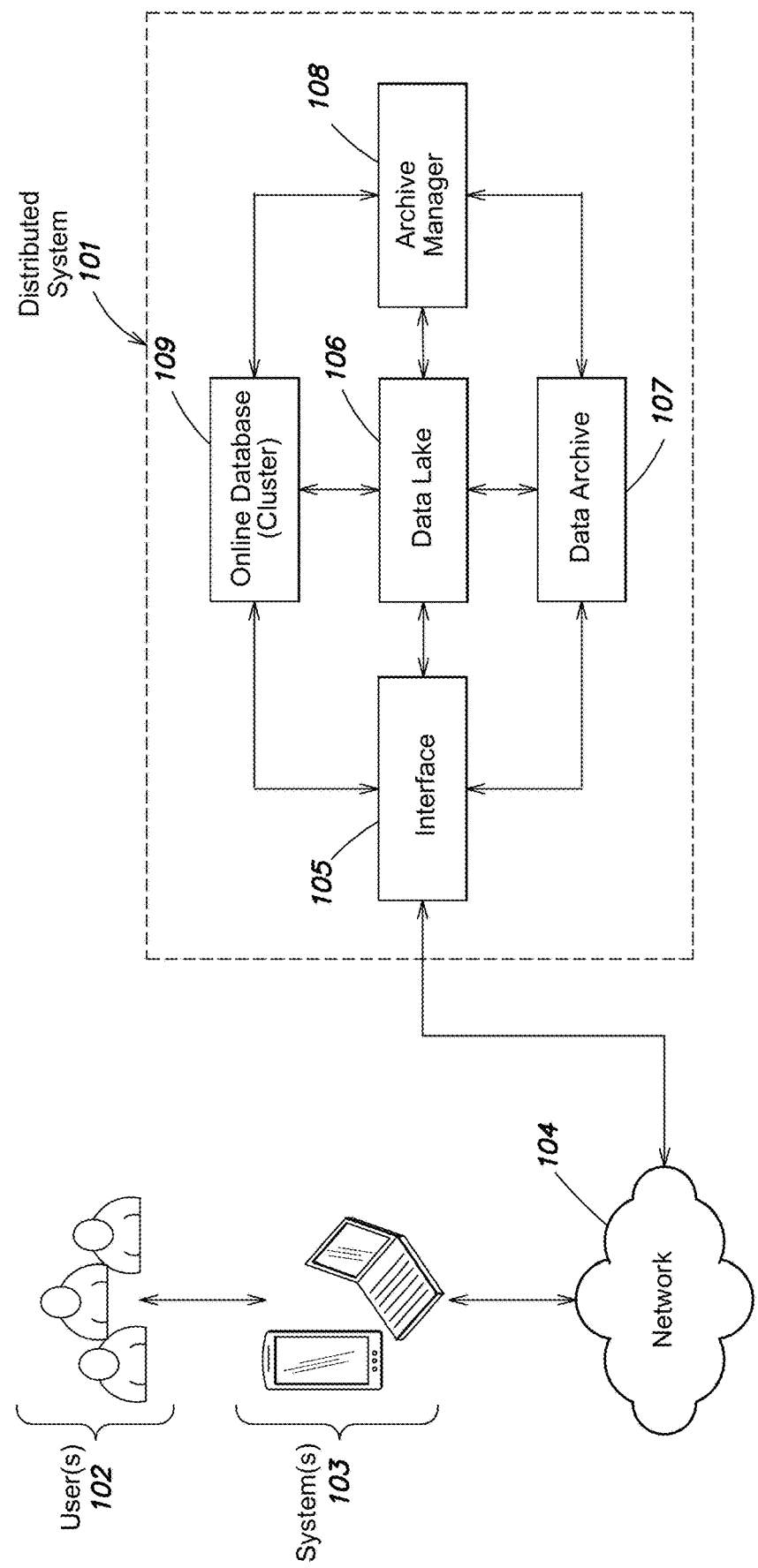
FIG. 1 shows a block diagram of an example distributed database system, according to some embodiments.

FIG. 1 shows a block diagram of an example distributed database system 101 according to some embodiments. In particular, a distributed system 101 is provided that includes a number of components coupled to one or more networks (e.g., network 104). Distributed system 101 fulfills one or more database operations requested by one or more systems 103 which may be, in some embodiments, in turn operated by one or more users 102 or other entities. For instance, in some examples, applications running on end user devices may be programmed to use a DaaS database for underlying data management functions. It should be appreciated that other systems, applications, client systems, or other entities may use DaaS database services.

In some embodiments, distributed system 101 includes an online-type database as well as an offline-type database for fulfilling database requests. In one embodiment, the distributed system provides a single access interface 105 performing database operations on both the online-type database and offline-type databases. In some examples, the online database is a DaaS-type database and may include, for example, cluster-based system. Online database 109 may be provided that performs read and write operations to storage entities configured in a database cluster (e.g., a cluster-based database such as the ATLAS database commercially available from MongoDB).

In some embodiments, an archive manager (e.g., archive manager 108) is provided that controls how data is archived from the online database to a data archive (e.g., data archive 107). In some implementations, the data archive may be implemented as cloud-based storage elements. For example, the data archive may use data buckets defined on S3 to create one or more archives associated with an online database. In some embodiments, a capability is provided for archiving data by the database management system that reduces management effort on behalf of application creators. In some embodiments, an archive manager 108 is provided that automatically archives data from an online database to an off-line database while maintaining a single point of interface to the database. In this manner, archiving operations are transparent to end user applications.

Further, a database may be provided that fulfills data read operations from one or more online and one or more offline data sources. In some embodiments, a data lake (e.g., data lake 106) is provided that provides a single view of offline and online storage. As is known, data lakes generally have the ability to store both structured and unstructured data. In some embodiments, the data lake may service read operations that reference an online database. In some embodiments, the database is a DaaS-based database that implements online storage using a cluster of nodes (e.g., online database (cluster) 109). Further, the data lake services read operations to a data archive (e.g., data archive 107, such as for example, one or more S3 data buckets). In some embodiments, the data lake may be used as a single view of online cluster data and archive data.

Figure 2:
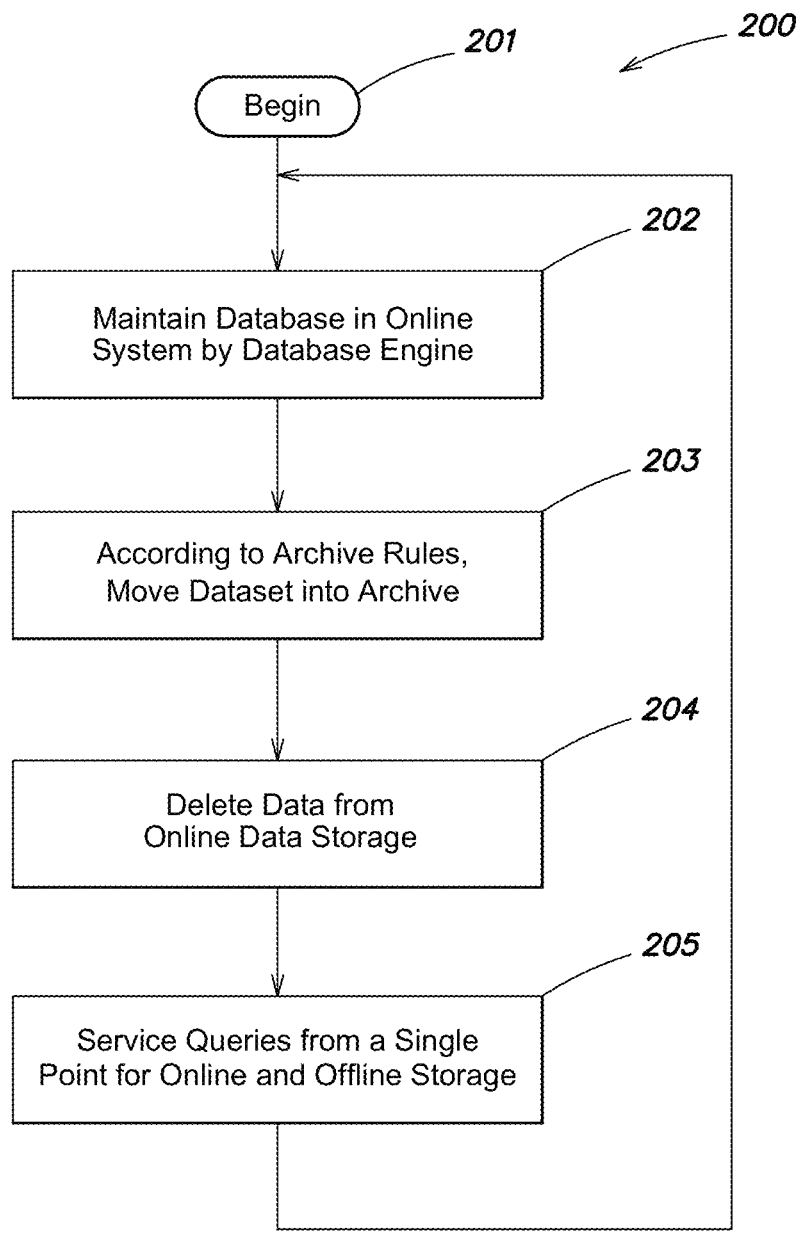
FIG. 2 shows a process for performing archive operations according to some embodiments.

FIG. 2 shows a process 200 for performing archive operations according to some embodiments. For example, one or more acts may be performed by one or more elements of the distributed database system (e.g., system 101). At block 201, process 200 begins. At block 202, the system maintains a database in an online system by a database engine. For example, there may be one or more processes that execute within a distributed database system to perform database operations on an online database. At block 203, a processing entity (e.g., an archive manager 108) moves one or more elements of a data set from the online database into an archive data set. In some embodiments, one or more archive rules are created that control what data is moved into the archive (and in some embodiments, when the data is moved). At block 204, the system deletes data from the online data storage that was archived. In this manner, database operations may become more efficient as unused or less frequently used data is transferred to the archive. At block 205, the system services read operations (e.g., queries) through a single point of access for both the online and off-line storage databases. This process continues over time as data in the data set grows and is gradually staged to off-line storage, yet access is still provided through the single point of access.

Figure 3:
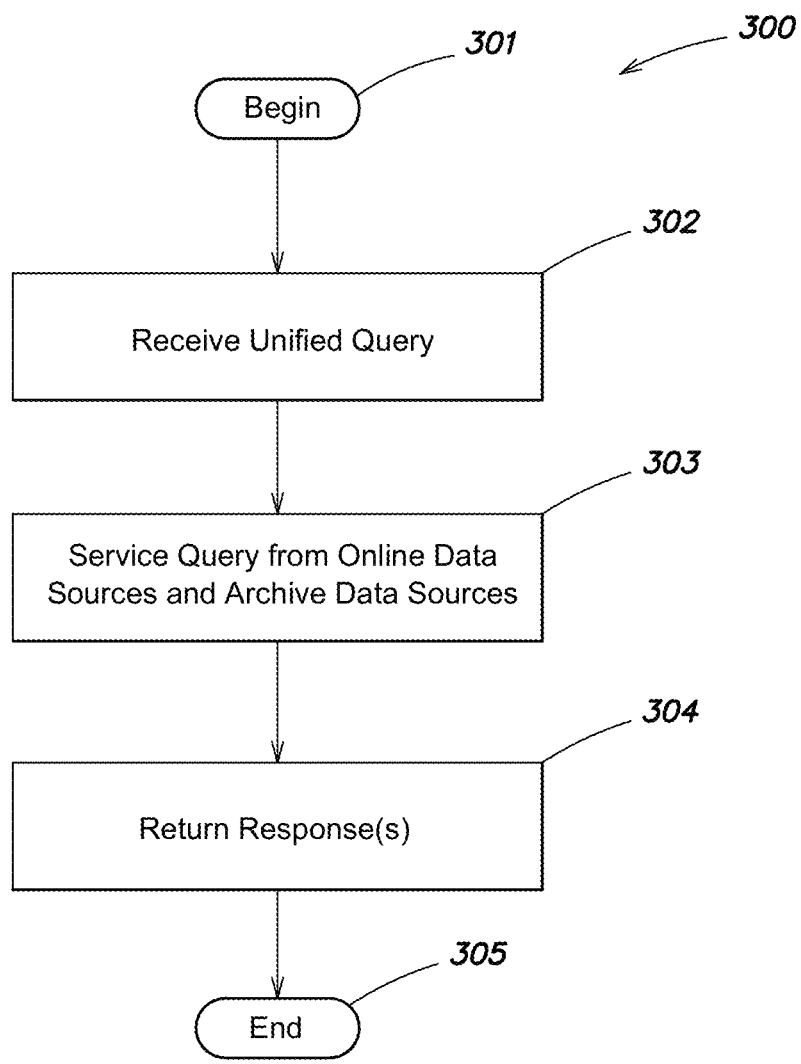
FIG. 3 shows a process for performing queries in a distributed database system according to various embodiments.

FIG. 3 shows a process 300 for performing queries in a distributed database system according to various embodiments. As discussed, the system is capable of performing unified query on multiple databases in a transparent manner. At block 301, process 300 begins. At block 302, the distributed database system receives a unified query. Such a query may be received, for example, from an application program executing on a system within the distributed network. The query or other database operation may be executed by one or more other systems, and processing entities, applications, or any other element within the network.

At block 303, the system services the query from one or more online data sources and one or more archive data sources. At block 304, the system returns any responses to the requesting party, and at block 305, process 300 ends.

Figure 4:
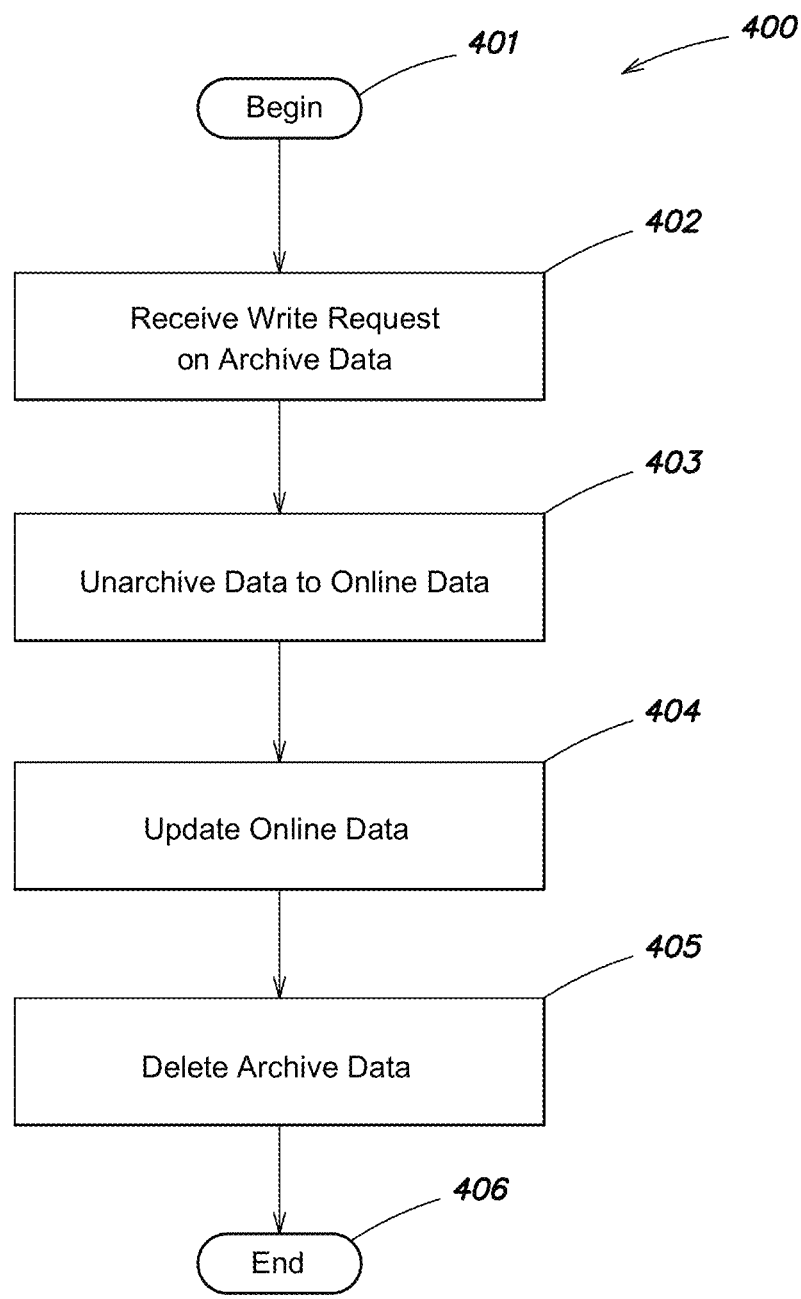
FIG. 4 shows a process for performing write operations in a distributed database system according to various embodiments.

In some embodiments, there may be a need to update data that is stored within the archive data set. FIG. 4 shows a process 400 for performing write operations in a distributed database system according to various embodiments. In particular, process 400 shows a process for handling a right operation on archive data. At block 401, process 400 begins. At block 402, the system receives a write request on archive data (e.g., via interface 105). At block 403, the system on archives data to online data storage. For example, this may be performed by an archive manager. At block 404, the system updates the online data which had previously been archived. In some embodiments, the system may be configured to delete the archive data (e.g., at block 405) resulting in a migration of the updated archive data to online data stores. At block 406, process 400 ends.

Figure 5:
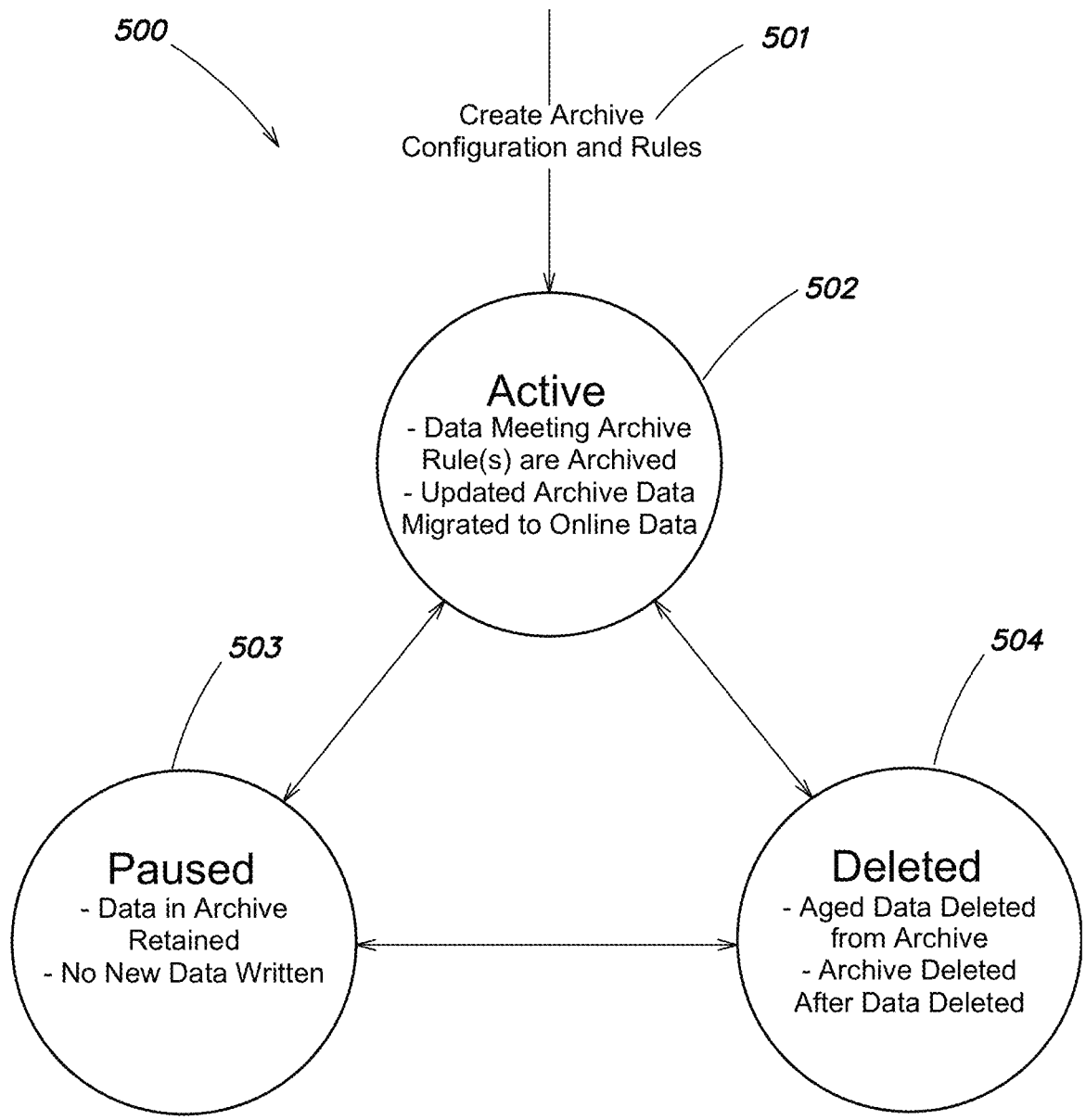
FIG. 5 shows an example state diagram associated with an archive manager of a distributed database system according to various embodiments.

In some embodiments, is appreciated that the archive manager may operate in a number of different states depending on the needs of the system. FIG. 5 shows an example state diagram associated with an archive manager of a distributed database system according to various embodiments. In particular, FIG. 5 shows a state process 500 that may be executed by archive manager according to some embodiments. At 501, the system creates an archive configuration, and in some embodiments, archive rules. Such archive rules may determine what data is archived (and possibly when it is destaged from online storage to off-line storage), allowing for different data tiers to be constructed.

At active state 502, the system is actively archiving data. In some embodiments, data meeting one or more archive rules are moved from online storage to offline stage. According to some embodiments, if data is updated in archive data, it may be migrated back to online data stores. In a paused state, the archiving process is paused at state 503, and no new data is moved from online to offline storage. That is, no new data is written by the archival process to archive storage. At a deleted state 504, aged data may be deleted by the archive as it achieves a certain age limit. When all data is deleted from an archive, the archive itself may be automatically deleted. In some embodiments, it is appreciated that an administrator may configure the system to operate in one or more archive states, such as described above.

Figure 6A:
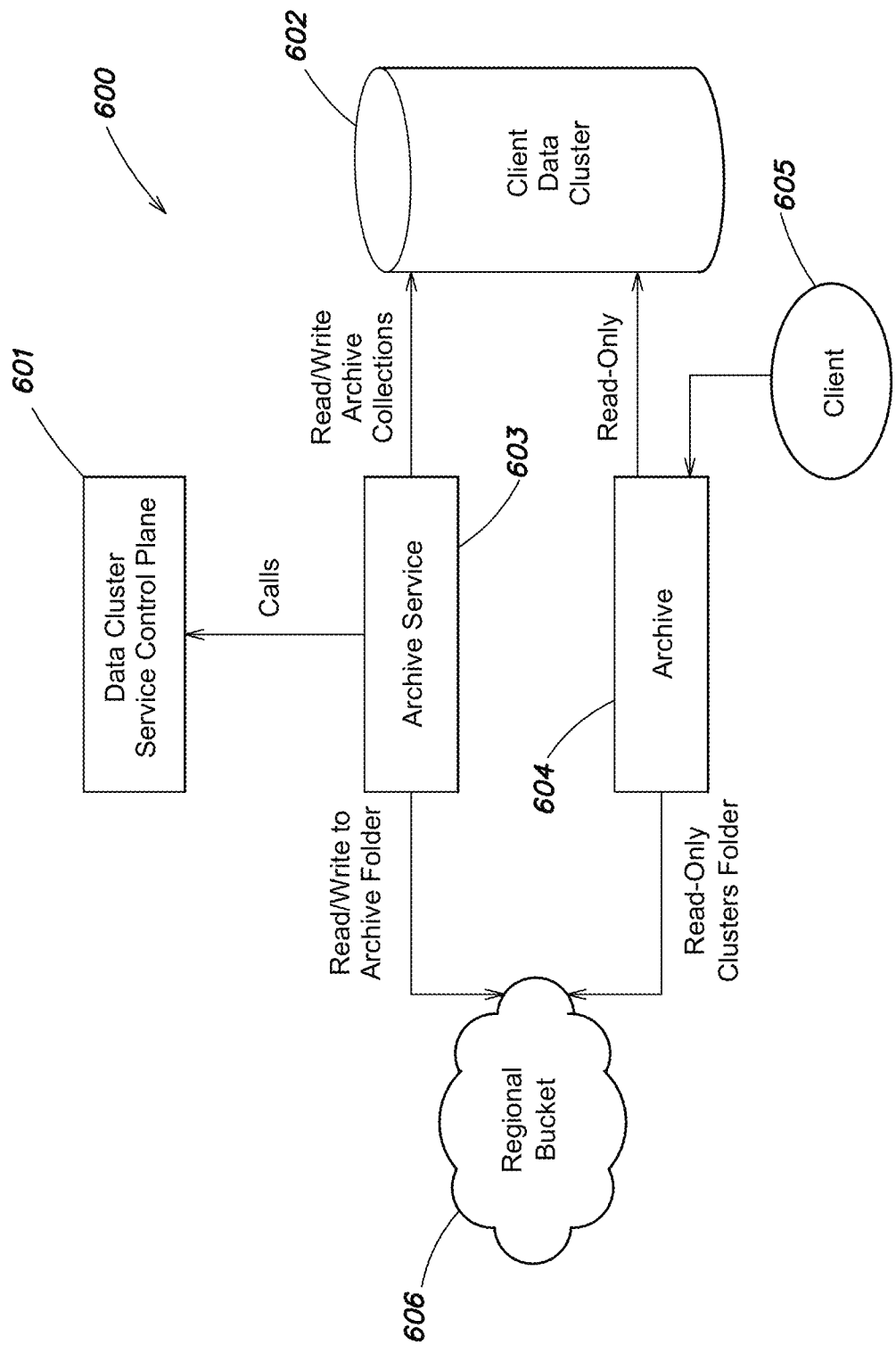
FIG. 6A shows an example implementation of an archival system in a distributed database system according to various embodiments.

FIG. 6A shows an example implementation of an archival system in a distributed database system according to various embodiments. In particular, a distributed system 600 is provided that includes an online database implemented in a client data cluster 602 (e.g., an ATLAS cluster). An archive management entity (e.g., archive service 603) may manage the archival process. Such processes may include performing calls to a data cluster service control plane, for example, to perform changes in configuration, find defined archiving configurations, read/write archive collections to the data cluster, perform read/write operations to an archive folder, among other functions.

An archive 604 (e.g., such as a data lake archive) may be provided that is a read-only archive which references archive folders created in a cloud-based storage service. For instance, archive data may be stored in one or more regional buckets (e.g., element 606) such as in S3. The archive may provide responses to database clients (e.g., client 605) for direct read operations that are served out of the read-only cluster folders defined in the cloud-based storage service.

Figure 6B:
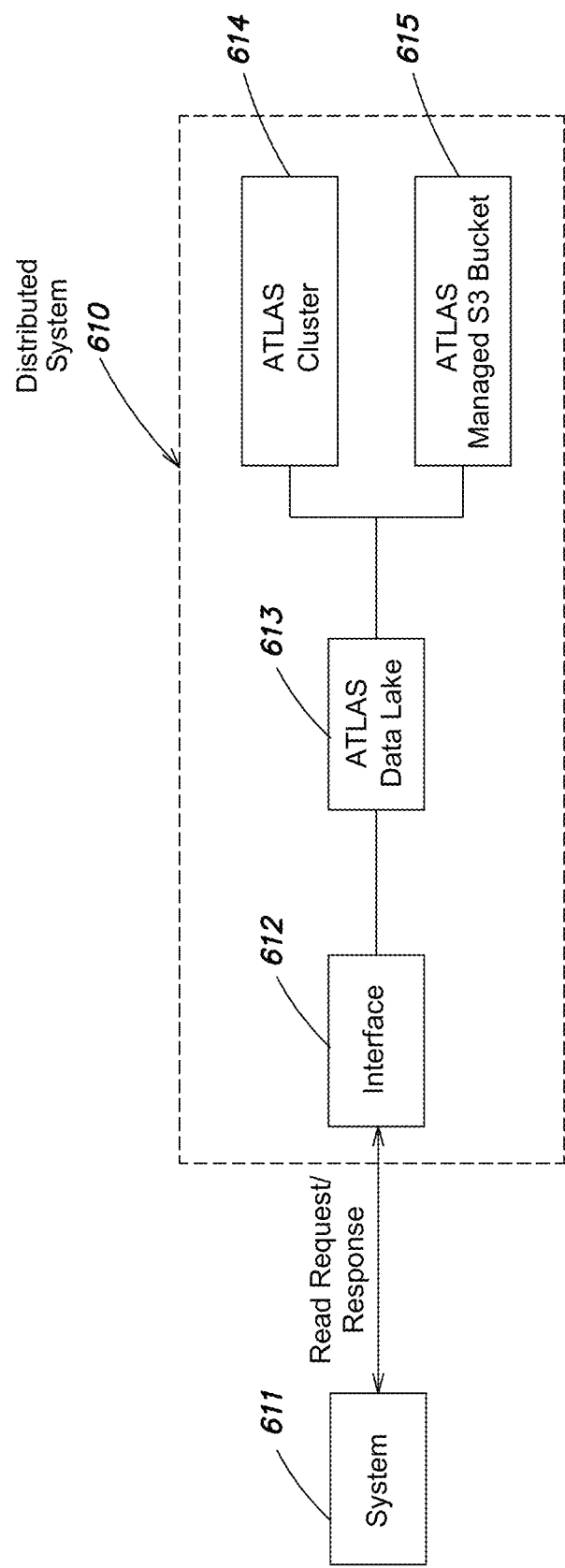
FIGS. 6B-6C show various embodiments of a data read and write architecture.
Figure 6C:
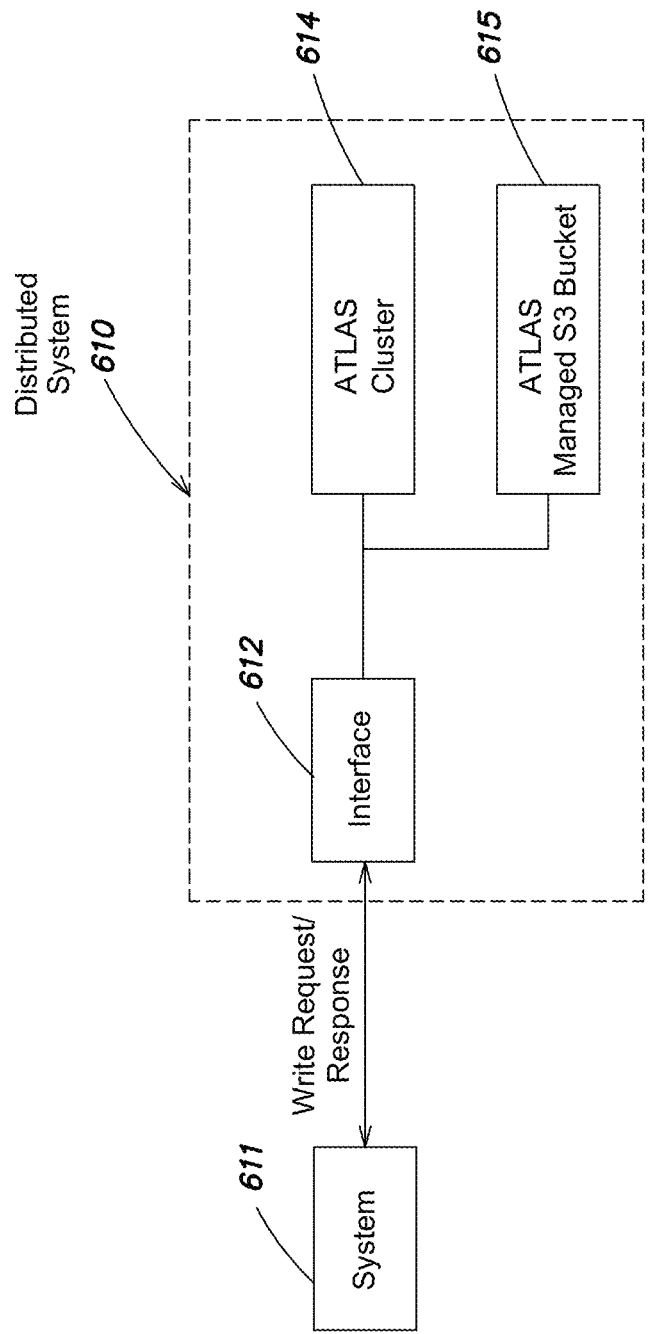

FIGS. 6B-6C show various embodiments of a data read and write architecture. In particular, FIG. 6B shows, in some implementations, an architecture for satisfying read operations in a distributed architecture. Distributed system 610 includes a distributed system 610 comprising an interface 612, a data lake (e.g., an ATLAS data lake), an online storage system such as an ATLAS cluster 614, and archive storage such as ATLAS-managed S3 bucket(s) 615. A system 611 may initiate a read request (such as a query) of the distributed system 610, and interface 612 receives the request and generates a response including data retrieved from one or both of the online and offline storage systems. In some embodiments, data lake 613 provides access to a virtual collection that is a union of data within the online and off-line storage systems. In some embodiments, the union of data appears as a single virtual collection, but in its implementation, the virtual collection comprises data in both online and off-line storage tiers. In one implementation, the data lake provides a read only view of cluster data and archive data stored in one or more S3 buckets. In some implementations, this union is performed similar to a UNION of two or more collections across the online and offline storage tiers.

FIG. 6C shows, in some implementations, an architecture for satisfying write operations in a distributed architecture. Similar to the architecture shown in FIG. 6B, distributed system 610 includes a number of elements including an interface 612, and online storage system such as ATLAS cluster 614, and archive storage such as ATLAS-managed S3 bucket(s) 615. System 611 initiate a write request to some data portion in the virtual collection, and the cluster 614 may process the write request. As discussed above, one or more archive rules may determine when data which is not frequently accessed is the staged to archive storage. For instance, administrators may set rules that determine when particular data is staged to archive storage. For example, a role may be defined that identifies that a document which is X days old, that document is copied to archive storage (e.g., the ATLAS managed S3 bucket) and is deleted from cluster data (e.g., the ATLAS cluster). In this way, active data which is regularly updated is stored in the online database, and older, less actively updated data is stored in archive storage and archive storage is used to satisfy read operations (e.g., from executed query operations). In this manner, less resources (e.g., storage, memory) are used in the ATLAS cluster, and overall performance of the database is improved.

It should also be appreciated that the distributed system may include one or more front end servers and backend servers that perform database operations. As discussed, the distributed system may be implemented within a cloud-based service infrastructure where data is located in a number of different locations and regions. In some embodiments the front end server does a processing of a query and routes a query to an agent server. This agent server may be located in a different location/read region, and the objective in some embodiments is to move computation closer to the data upon which the computation is performed. In this manner, database operations are more efficient and require less bandwidth (e.g., the data is acted on in its location/region and is not transferred to a centralized agent for processing).

The front end server may perform functions such as establishing and maintaining connections, performing security operations, defining a query execution plan, performing some optimization, authorizing queries, among other operations. The front end server also determines where data is being operated on (e.g., data located in S3 buckets located in Dublin Ireland), and the front end server forwards a query plan to an agent server located closer to the data (e.g., in Dublin Ireland). The agent server which is local to the data executes the query plan at the location without having to haul data and incur data transfer cost and additional latency. The agent server operating locally also may perform one or more filtering operations on the data. The agent servers that satisfy a particular query may use map-reduce algorithms to report up to a coordinating agent which returns results to the front end server. In some embodiments, it is appreciated that multiple parallel readers (e.g., agent servers) may be used to read data in parallel from one or more S3 buckets, which improves read performance.

Data Lake Architecture

It should be appreciated that in some embodiments, various aspects may be implemented in a data lake architecture that utilizes a fast access cluster-based database as well as secondary storage to satisfy a unified read request. Stated broadly, various aspects describe systems and methods for large scale unstructured database systems. According to some embodiments, the large-scale unstructured database systems can include the ability to support a range of operations such as create, read, update and delete operations using a storage hierarchy, such as main memory and disk, which are considered to be online storage. Online storage, according to some embodiments described herein, refers to database data kept in active memory or on executing resources that enable fast operation execution (e.g., read, write, modify, etc.) that can be on premise physical hardware or can be instantiated cloud resources. Such online data can be accessed quickly, for example, in response to queries on the database.

The inventors have realized that as the amount of data in a database system grows, users often want to be able to perform read operations on some data, such as historical data, but do not need to perform create, update or delete operations on this data. According to some embodiments, databases and/or database services can be architected that provide support for read operations and use a different type of storage from the main memory or disk to store the data, including a different type of storage, such as, for example, distributed object storage. Distributed object storage can provide one or more features, such as a high data durability guarantee, a significant cost savings compared with the disk technologies typically used in database systems, and/or can be available from one or more data center locations, which can facilitate using the distributed object storage to provide database services to clients in many locations.

The inventors have further realized that distributed object storage can be slow to access, may not support random access write or update operations, and/or may have other deficiencies compared to using main memory or disk. For example, object data from a distributed object storage can be stored as a data lake that can provide a massive storage volume at low cost, that is, however, slow to access. A data lake approach that involves storing data as a blob or object that is typically optimized according to the specifications of a cloud-based object storage provider, but this approach can make it more difficult to retrieve the data based on structural constraints of the object storage service, the data lake's architecture, and/or the like. The inventors have appreciated that distributed object storage can have one or more deficiencies, such as supporting append-only writes rather than writes to an arbitrary location, providing read access with higher latency and lower throughput than memory or disk, requiring complex configuration procedures to allow object data to be queryable, and/or failing to support coherent online and offline databases, including only spinning-up compute resources to access offline portions of a database when needed. Implementations of database systems using distributed object storage have further imposed limitations such as requiring structured queries (e.g., using SQL) and flattening data into tables in order to search the data (e.g., which can lose fidelity). In some embodiments, a distributed system is provided that satisfies read operations from a union of fast storage source and a distributed object storage source.

In various embodiments, virtual "collections" of distributed object data can be specified and queried in a manner that is directly analogous to querying collections in a document database system or querying tables in a relational database system. In some embodiments, the techniques can allow a customer to specify the buckets of files in the data lake and/or to provide information regarding the files in the data lake that can be used to generate the virtual collections (e.g., in a storage configuration file or by executing commands such as Data Definition Language commands). In some embodiments, the information used to build the virtual collections can be specified in the file names, such as by using fields of the file names. The techniques can include using the information in the file names to partition the data in the data lake to quickly limit and identify relevant documents to a particular query. The query can be executed in geographical proximity to the data, and the query can be divided across multiple processing nodes, such that each processing node can process an associated set of files, and the results of each processing node can be combined to generate the full set of query results.

Various aspects described herein may be implemented with one or more embodiments (either alone or in combination with one or more features) described in U.S. patent application entitled "LARGE SCALE UNSTRUCTURED DATABASE SYSTEMS," filed Jun. 8, 2020 under U.S. Ser. No. 16/895,340, the entire contents of which are incorporated by reference herein by its entirety.

Various embodiments are further described in U.S. Provisional Application Ser. No. 63/036,134 filed Jun. 8, 2020, entitled "SYSTEM AND METHOD FOR PERFORMING ONLINE ARCHIVING OPERATIONS" to which priority is claimed. This application is incorporated by reference in its entirety and the application and its Appendices form an integral part of the instant specification. Various aspects shown and described therein may be used alone or in combination with any other embodiment as described herein.

Various Additional Embodiments

It should be appreciated that various embodiments may be performed alone or in combination with other elements, and may include one or more detailed functions, operations, and/or interfaces within the distributed database system. For example, various embodiments may include the following implementation features, used alone or in combination with any other feature described herein:
  Online archive feature is accessible on cluster-level (e.g., in its own tab or section within a management interface)
  Feature is available for dedicated clusters
  On that feature section within the management interface, users are permitted by the system to define archive configurations
  Archive Configurations (in some embodiments):
    An Archive is defined by a namespace and an archiving rule.
    Database name and collection are filled in using simple text fields (i.e., in one example an interface is provided with no drop downs)
    An Archive can be in the following states: Active, Paused, Deleted. When paused the data stays in S3 but the system does not archive anything else (in one implementation). When the archive is deleted, the data is deleted from S3 after 5 or other predetermined number of days, and the actual archive configuration will be "deleted" after the data is deleted from S3.
    In some embodiments, Multiple Archives can exist for a namespace but, in some embodiments, only a single one can be in an Active state.
    Support the use case for changing partition structure.
      To migrate manually using an ATLAS database, a user can mongodump their old collection, delete the archive, and mongorestore that data back to their cluster. UI for Archives may show (within the interface) the date range of data they contain to assist this process.
  According to some embodiments, there is a unique constraint for archives on namespace+partitioning fields. So, in some embodiments, multiple active archives on the same collection with the same partitioning fields are disallowed. These fields are used to determine the names of the data files that are associated with a certain archive, so in some implementations, it is unique.
  For each rule, a user specifies a date field and number of days X. For example, once the current date becomes greater than the date field value+number of days, the document (or other database element) is archived.
  Rule definition include specifying up to two partitioning fields in addition to the archiving date field ("archiving date" is the field in the customers document, not the date it is archived).
  In some embodiments, data may be chunked data into blocks representing sections of time which allows efficient querying. Data partitions based on the date field from the document will be "truncated" to the day (even if they are timestamps with seconds) so that the system can more easily chunk documents into files.
  Archive structure in S3: <mdb s3 bucket>/<project-id>/<cluster-unique-id>/<db name>/<collection uuid>[/partition field1][/partition field2]
  Editing Archives: Users are permitted by the system to edit the number of days upon which to archive a document of an existing Archive. However, in some specific implementations, namespace, date field, partitioning fields are immutable and cannot be changed.
  Archive validation:
    Not validating if the namespace exists in some examples. Users can define archives before creating databases/collections.
    In some implementations, the system does not validate if documents have the date field present or if there is an index defined on the date field. However, the UI will strongly recommend that the date field have an index on it. If the user does not have a sufficient index defined, the archive job will still run but the user will receive a UI alert.
  Limit of number of archive configurations per cluster: There may be defined a soft/hard limit to the number of archive configurations for a given cluster. Those are (soft/hard)
    Total archives per cluster: 50/200
    Total active archives per cluster: 20/50
  Data Lake:
    A Data Lake is created for the auto archive upon the creation of the first rule. In some implementations, users are permitted by the system to see the connection string of the Data Lake. Where: UI of the Connection Model of the Atlas Cluster and Online Archive 'Archives Page'
    In some implementations, there is defined one Data Lake per cluster.
    Data lake configuration will not be visible/accessible by the customer in UI or through the Data Lake itself. In some implementations:

storageSetConfig command will be disallowed, whether it was used for viewing current configuration or changing existing configuration.

$out to S3 for Online Archive Data Lakes is disallowed.

Customers will not be given direct access to the S3 bucket/folders holding their data, but rather read requests are processed by an archive service.

Archive Job:

Archiving job is executed by, for example, the MongoDB Agent

File naming convention: <mdb s3 bucket>/<project-id>/<cluster-unique-id>/<db name>/<collection uuid>[/partition field1][/partition field2]/<Epoch Seconds value range>-<batch-number>.jsonJob will run periodically every 5 minutes and will push documents matching the archive rule to S3 in batches. So a single run may produce multiple batches. To avoid producing many small files during job run, the archive job process may be "smart" and may be configured to extend the period dynamically (possibly also have a max limit of period).

Jan. 1, 2020 between 00:00:00 and 23:59:59 GMT is 1577836800-1577923199 and the storage config would be:
{min(fieldDate) epoch_secs}-{max(fleidDate)epoch_secs}

S3 bucket implementations

In some embodiments, S3 buckets are managed by the DaaS-based database cluster (e.g., ATLAS DaaS system).

Default Encryption at Rest is enabled for all the S3 Buckets used.

One bucket per AWS region may be used to be shared by all customers.

S3 ACL:

Data Lake may have a read-only access to a specific folder which will be the cluster's folder within the region's S3 bucket.

Archive job may have read/write access to the cluster's folder in S3

STS Tokens may be scope to the sub-path of the unique cluster id for both the read path on data lake and the write path on the agent.

Data retention

Delete Cluster: deleting a cluster results in the deletion of an archive, in some embodiments, the system warns users to move data off the cluster AND archive prior to deleting. The archive should (in some implementations) be deleted after 5 days just like the cluster data.

Pause Archive: If an archive is paused, the system is configured to stop archiving data immediately. Data in archive will be retained. The user will continue to be billed for storage and reading data.

Delete Archive: When an archive is deleted then actual data in S3 associated with the archive will be deleted after a predetermined time (e.g., 5 days).

Database/Collection dropped: This will not affect the archive definition/data in S3 since, in some implementations, the system may permit defining archives on namespaces that do not exist.

Data Lake retention

If all archives get deleted, then the data lake will be retained for as long as the data is retained (e.g., 5 days after the deletion of the last archive).

If a new archive was defined after, then a new data lake is created with a new connection string.

Other features:

Allow multiple active archives on a single collection

Allow archiving on a non-date field

Allow custom $match query

Allow more than 2 fields for partitioning (not include the archiving on date field)

Allow duration to be set in other than days such as hours/minutes/etc.

Real-time archive job

Expose Data Lake for online archive in Data Lake section

Expose S3 bucket to customer

Allow updating data in S3

Allow move data from S3 archive to clusters

Allow using customer's own S3 buckets

Allow editing an existing rule's date field or partition fields

Merge a Paused archive into the Active archive by rewriting all of the files.

Allow multiple active archives per database/collection where the system writes each document N times (i.e. indexes).

Special support for global clusters (i.e. having a bucket in each region and routing data accordingly)

Allow multiple archives on the same collection with the same partitioning fields.

Support Online Archive for tenant clusters.

Allow customers to define a criteria for periodic deletion of data from the Online Archive Provide support for "Bring Your Own Keys"

Supporting S3 Private Link

Preserve document changes made during archive operation.

Figure 7:
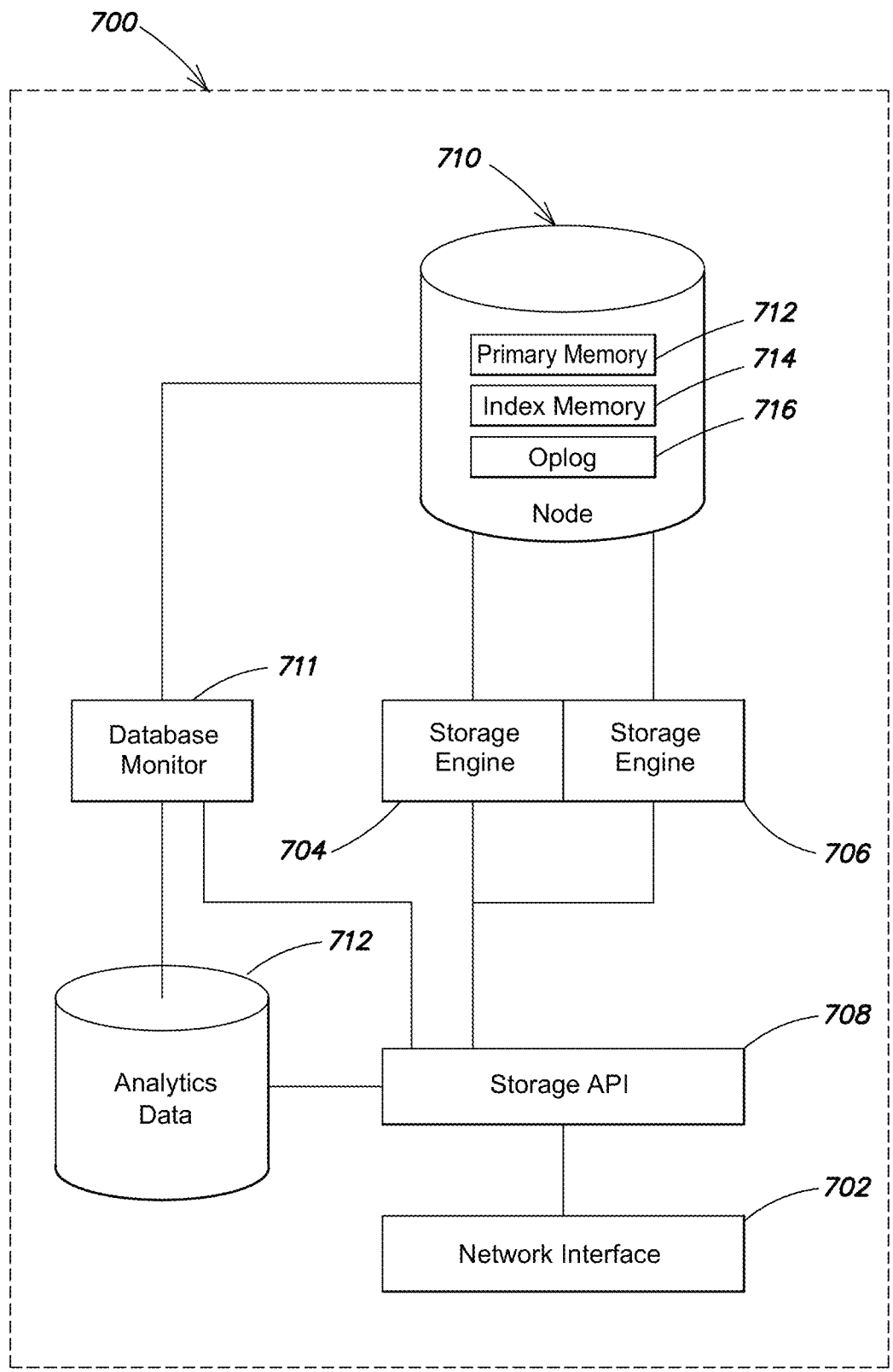
FIG. 7 shows a block diagram of a distributed database system in which various embodiments may be implemented.

Allow scheduling of archival jobs so that customers can specify when the additional load from archival will be present Parallelize archiving for sharded clusters by having an archiving service run on each shard of cluster to increase throughput Example Database Systems Various embodiments as discussed herein may be implemented on various database and storage systems. FIG. 7 shows a block diagram of a distributed database system in which various embodiments may be implemented. In particular, FIG. 7 shows an example of a database subsystem 700 that may be implemented in cloud storage system (and/or a local storage system). The database subsystem 700 is one example implementation of all or any portion of the database management system shown by way of example in FIG. 1. The database subsystem 200 includes an interface 702 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977, 563, which is hereby incorporated by reference in its entirety. The database subsystem 700 includes a storage application. In one implementation described in greater detail below, a base unit of data is a document.

In some embodiments, a storage application programming interface (API) 708 receives database requests, including requests to perform read and write operations. When a write operation is requested, the storage API 708 in response selectively triggers a first storage engine 704 or a second storage engine 706 configured to store data in a first data format or second data format, respectively, in node 710. As discussed in more detail below, a database monitor 711 may track a number of analytics about the database. In some embodiments, the database monitor 711 is configured to track the operations performed on the data over time, and stores that information as analytics data 713. In some examples, analytic data may be stored in a separate database. In other examples, the analytics data is stored as a name collection (i.e., a logical grouping of data). These analytics may be provided to the storage API 708, which relies on the analytics to selectively actuate an appropriate storage engine. In further embodiments, although multiple storage engines are provided, not all storage engines may operate with snapshots. Responsive to a command execution that includes operations involving snapshots, the system may force use of a particular storage engine or alternatively provide error information that the current storage engine does not support the functionality. Thus, the system can be configured to check capability of storage engines to support certain functions (e.g., snapshot read functions) and report on the same to end users.

In one example, the database monitor 711 tracks the relative number of read and write operations performed on a collection within the database. In another example, the database monitor 711 is configured to track any operations (e.g., reads, writes, etc.) performed on any base unit of data (e.g., documents) in the database.

In some embodiments, the storage API 708 uses the tracked data (e.g., analytics data) collected by the database monitor 711 and/or the analytics data 713 to select an optimal storage engine for a database, a collection, or a document having the observed read/write ratio. In one example, the storage API 708 is mapped to the selected storage engine. For example, an identifier of the selected storage engine may be stored in a location in memory or on disk; when a write operation request is received by the storage API 708, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 711 itself is configured to determine an optimal storage engine based on the analytics data 713 and other aspects of the data, for example, stored in the database, database collection, or in a document. This determination may be passed to the storage API 708, or otherwise used to map the storage API 708 to a determined storage engine.

The storage API 708 receives database write requests (e.g., from a database API (not shown)) via a network interface 707, and carries out the requested operations by selectively triggering one of the first storage engine 704 and the second storage engine 706. The first storage engine 704 and the second storage engine 706 are executable software modules configured to store database data in the data node 710 in a particular data format. For example, the first storage engine 704 may be configured to store data in a row-store format, and the second storage engine 706 may be configured to store data in a LSM-tree format. In one example, the first storage engine 704 and/or the second storage engine 706 are configured store primary database data (i.e., the data being stored and queried) in a particular data format in the primary data memory 712 and may store database index data in a particular data format in index data memory 714. In one embodiment, the first storage engine 704 and/or the second storage engine 706 are configured store an operation log (referred to as an "oplog") 716 in a particular data format. As discussed in more detail below, a database monitor 711 may track a number of analytics about the database, and the operations performed on it over time, and stores that information as analytics data 713.

One advantage of using the storage API 708 as an abstraction layer between the database API and the storage engines is that the identity and selection of a particular storage engine can be transparent to the database API and/or a user interacting with the database API. For example, the database API may pass a "write" function call to the storage API 708 instructing the storage API to write a particular set of data to the database. The storage API 108 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 708, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 708 is the ability to add, remove, or modify storage engines without modifying the requests being passed to the API 708. The storage API 708 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines.

Figure 8:
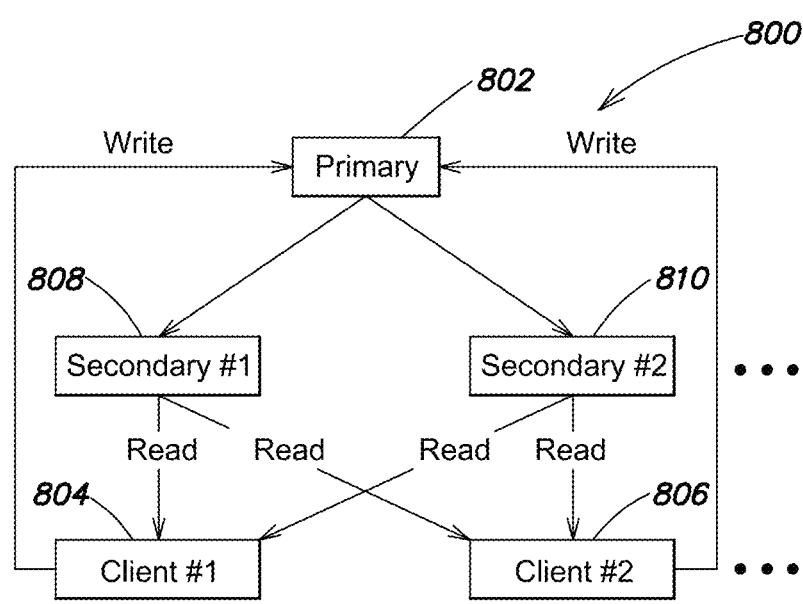
FIG. 8 illustrates a block diagram of an example replica set hosting a distributed database, according to some embodiments.

The embodiment shown and discussed with respect to FIG. 7 depicts a single database node 710. Yet in some embodiments, multiple database nodes may be provided and arranged in a replica set. FIG. 8 shows a block diagram of an exemplary replica set 800. Replica set 800 includes a primary node 802 and one or more secondary nodes 808 and 810, each of which is configured to store a dataset that has been inserted into the database. The primary node 802 may be configured to store all of the documents currently in the database and may be considered and treated as the authoritative version of the database in the event that any conflicts or discrepancies arise, as will be discussed in more detail below. While two secondary nodes 808, 810 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 802 and secondary nodes 808, 810 may be configured to store data in any number of database formats or data structures as are known in the art. In a preferred embodiment, the primary node 802 is configured to store documents or other structures associated with non-relational databases. The embodiments discussed herein relate to documents of a document-based database, such as those offered by MongoDB, Inc. (of New York, New York and Palo Alto, California), but other data structures and arrangements are within the scope of the disclosure as well.

In some embodiments, the replica set primary node 802 only accepts write requests (disallowing read requests) from client systems 804, 806 and the secondary nodes 808, 810 only accept reads requests (disallowing write requests) from client systems 804, 806. In such embodiments, the primary node 802 receives and processes write requests against the database, and replicates the operation/transaction asynchronously throughout the system to the secondary nodes 808, 810. In one example, the primary node 802 receives and performs client write operations and generates an oplog. Each logged operation is replicated to, and carried out by, each of the secondary nodes 808, 810, thereby bringing those secondary nodes into synchronization with the primary node 802. In some embodiments, the secondary nodes 808, 810 may query the primary node 802 to receive the operation log and identify operations that need to be replicated. In other embodiments, the operation log may be transmitted from the primary node 802 to the secondary nodes 808, 810 periodically or in response to the occurrence of a predefined condition, such as accruing a threshold number of operations in the operation log that have not yet been sent to the secondary nodes 808, 810. Other implementations can be configured to provide different levels of consistency, and, for example, by restricting read requests. According to one embodiment, read requests can be restricted to systems having up to date data, read requests can also in some settings be restricted to primary systems, among other options.

In some embodiments, both read operations may be permitted at any node (including primary node 802 or secondary nodes 808, 810) and write operations limited to primary nodes in response to requests from clients. The scalability of read operations can be achieved by adding nodes and database instances. In some embodiments, the primary node 802 and/or the secondary nodes 808, 810 are configured to respond to read operation requests by either performing the read operation at that node or by delegating the read request operation to another node (e.g., a particular secondary node 808). Such delegation may be performed based on load-balancing and traffic direction techniques. In other embodiments, read distribution can be managed based on a respective snapshot available at various nodes within a distributed database. For example, the system can determine based on analyzing client requested data what snapshot is associated with the requested data and what node hosts the respective data or snapshot that can be used to provide the requested data. In one example, a data routing processor accesses configuration files for respective replica sets to determine what node can respond to a data request, and further analysis of respective snapshots can determine, for example, what node within a replica set needs to be accessed.

In some embodiments, the primary node 802 and the secondary nodes 808, 810 may operate together to form a replica set 800 that achieves eventual consistency, meaning that replication of database changes to the secondary nodes 808, 810 may occur asynchronously. When write operations cease, all replica nodes of a database will eventually "converge," or become consistent. The eventually consistent model provides for a loose form of consistency.

Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 808, 810 may handle the bulk of the read operations made on the replica set 800, whereas the primary node 808, 810 handles the write operations. For read operations where a high level of accuracy is important (such as the operations involved in creating a secondary node), read operations may be performed against the primary node 802. In some embodiments, replica set 800 can be configured to perform according to a single writer eventually consistent model.

It will be appreciated that the difference between the primary node 802 and the one or more secondary nodes 808, 810 in a given replica set may be largely the designation itself and the resulting behavior of the node; the data, functionality, and configuration associated with the nodes may be largely identical, or capable of being identical (e.g., secondary nodes can be elevated to primary nodes in the event of failure). Thus, when one or more nodes within a replica set 800 fail or otherwise become available for read and/or write operations, other nodes may change roles to address the failure. For example, if the primary node 802 were to fail, a secondary node 808 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 800 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 802 may be connected by a LAN, a WAN, or other connection to one or more of the secondary nodes 808, 810, which in turn may be connected to one or more other secondary nodes in the replica set 800. Connections between secondary nodes 808, 810 may allow the different secondary nodes to communicate with each other, for example, in the event that the primary node 802 fails or becomes unavailable and a secondary node must assume the role of the primary node.

According to one embodiment, a plurality of nodes (e.g., primary nodes and/or secondary nodes) can be organized in groups of nodes in which data is stored and replicated across the nodes of the set. Each group can be configured as a replica set. In another embodiment, one or more nodes are established as primary nodes that host a writable copy of the database. Each primary node can be responsible for a portion of the database, e.g. a database shard. Database sharding breaks up sections of the database into smaller portions based on, for example, ranges of the data. In some implementations, database sharding facilitates scaling a primary-secondary architecture over a large number of nodes and/or large database implementations. In one embodiment, each database shard has one primary node which replicates its data to its secondary nodes. Database shards can employ location preferences. For example, in a database that includes user records, the majority of accesses can come from specific locations. Migrating a shard primary node to be proximate to those requests can improve efficiency and response time. For example, if a shard for user profile includes address information, shards can be based on ranges within the user profiles, including address information. If the nodes hosting the shard and/or the shard primary node are located proximate to those addresses, improved efficiency can result, as one may observe the majority of requests for that information to come from locations proximate to the addresses within the shard.

Figure 9:
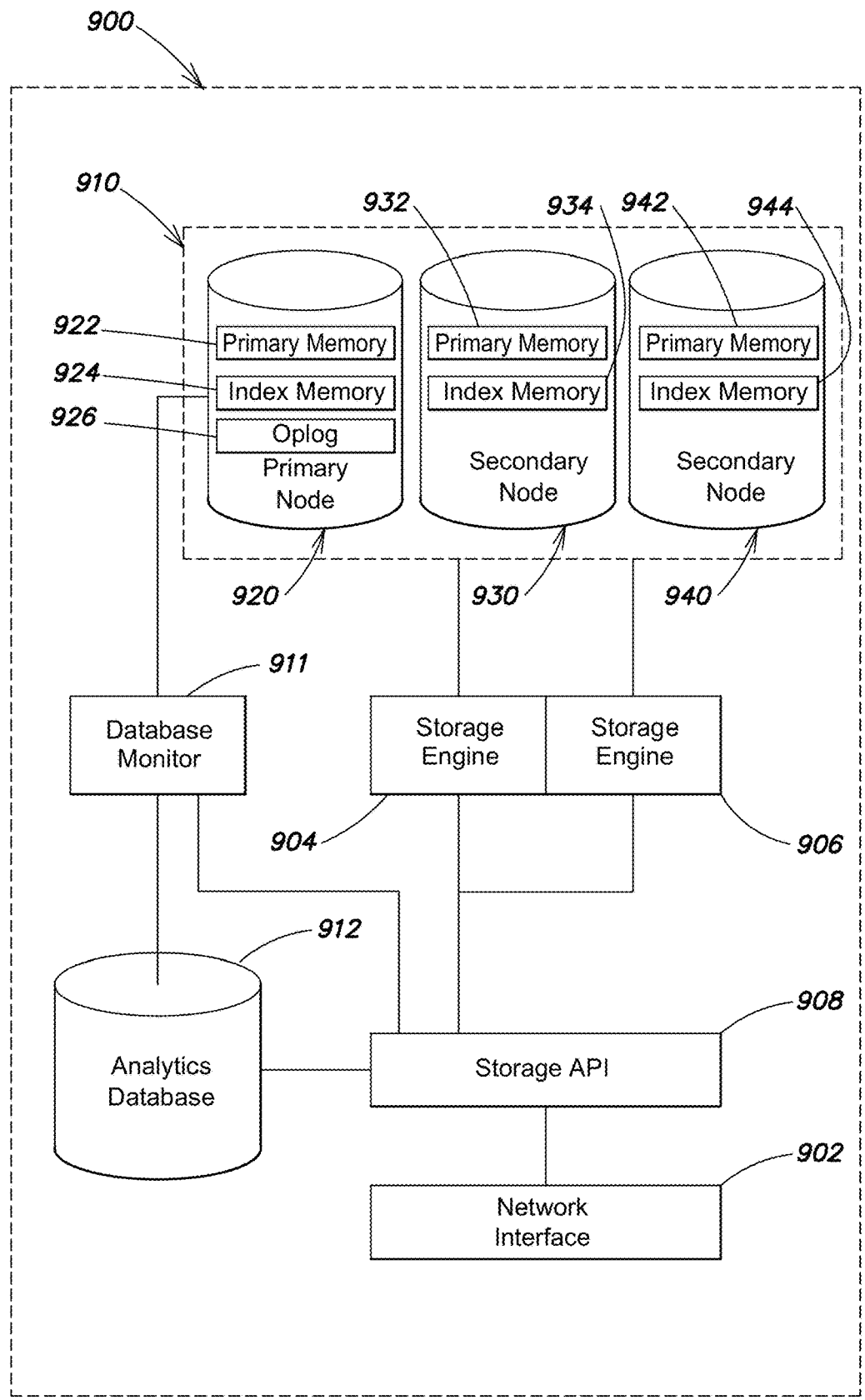
FIG. 9 illustrates a block diagram of another example distributed database system, according to some embodiments.

An example of a database subsystem 900 incorporating a replica set 410 is shown in FIG. 9. As can be seen, database subsystem 900 incorporates many of the elements of database subsystem 700 of FIG. 7 including the network interface 702, the storage engines 704, 706, the storage API 708, the database monitor 711, and the analytics database 712. Relative to the database subsystem 700 shown in FIG. 7, the database subsystem 900 replaces the single node 710 with a replica set 910 comprising primary node 920 and secondary nodes 930 and 940. In one example, the replica set 910 functions in much the same manner as the replica set 300 discussed with respect to FIG. 8. While only two secondary nodes 930 and 940 are shown for illustrative purposes, it will be appreciated that the number of secondary nodes may be scaled up or down as desired or necessary.

In one example, database operation requests directed to the replica set 910 may be processed by the primary node 920 and either performed by the primary node 920 or directed to a secondary node 930, 940 as appropriate. In one embodiment, both read and write operations are permitted at any node (including primary node 920 or secondary nodes 930, 940) in response to requests from clients. The scalability of read operations can be achieved by adding nodes and database instances. In some embodiments, the primary node 920 and/or the secondary nodes 930, 940 are configured to respond to read operation requests by either performing the read operation at that node or by delegating the read request operation to another node (e.g., a particular secondary node 930). Such delegation may be performed based on various load-balancing and traffic direction techniques.

In some embodiments, the database only allows write operations to be performed at the primary node 920, with the secondary nodes 930, 940 disallowing write operations. In such embodiments, the primary node 920 receives and processes write requests against the database, and replicates the operation/transaction asynchronously throughout the system to the secondary nodes 930, 940. In one example, the primary node 920 receives and performs client write operations and generates an oplog. Each logged operation is replicated to, and carried out by, each of the secondary nodes 930, 940, thereby bringing those secondary nodes into synchronization with the primary node 920 under an eventual-consistency model.

In one example, primary database data (i.e., the data being stored and queried) may be stored by one or more data storage engines in one or more data formats in the primary data memory 922, 932, 942 of nodes 920, 930, 940, respectively. Database index data may be stored by one or more data storage engines in one or more data formats in the index data memory 924, 934, 944 of nodes 920, 930, 940, respectively. Oplog data may be stored by a data storage engine in a data format in oplog data memory 926 of node 920.

Example Special-Purpose Computer System

A special-purpose computer system can be specially configured as disclosed herein. According to one embodiment the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 10:
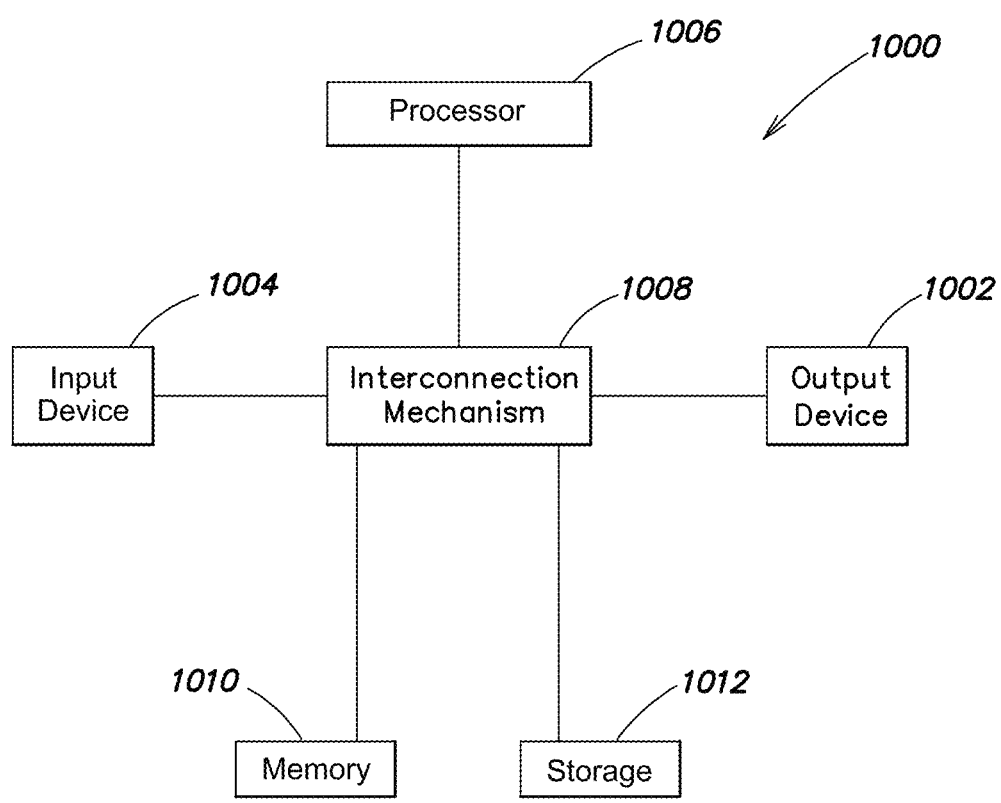
FIG. 10 is a block diagram of an example special-purpose computer system, according to some embodiments.

FIG. 10 shows a block diagram of an example special-purpose computer system 1000 on which various aspects of the present invention can be practiced. For example, computer system 1000 may include a processor 1006 connected to one or more memory devices 1010, such as a disk drive, memory, or other device for storing data. Memory 1010 is typically used for storing programs and data during operation of the computer system 1000. Components of computer system 1000 can be coupled by an interconnection mechanism 1008, which may include one or more busses (e.g., between components that are integrated within a same machine) and/or a network (e.g., between components that reside on separate discrete machines). The interconnection mechanism enables communications (e.g., data, instructions) to be exchanged between system components of system 1000.

Computer system 1000 may also include one or more input/output (I/O) devices 1002-1004, for example, a keyboard, mouse, trackball, microphone, touch screen, a printing device, display screen, speaker, etc. Storage 1012, typically includes a computer readable and writeable nonvolatile recording medium in which computer executable instructions are stored that define a program to be executed by the processor or information stored on or in the medium to be processed by the program.

Figure 11:
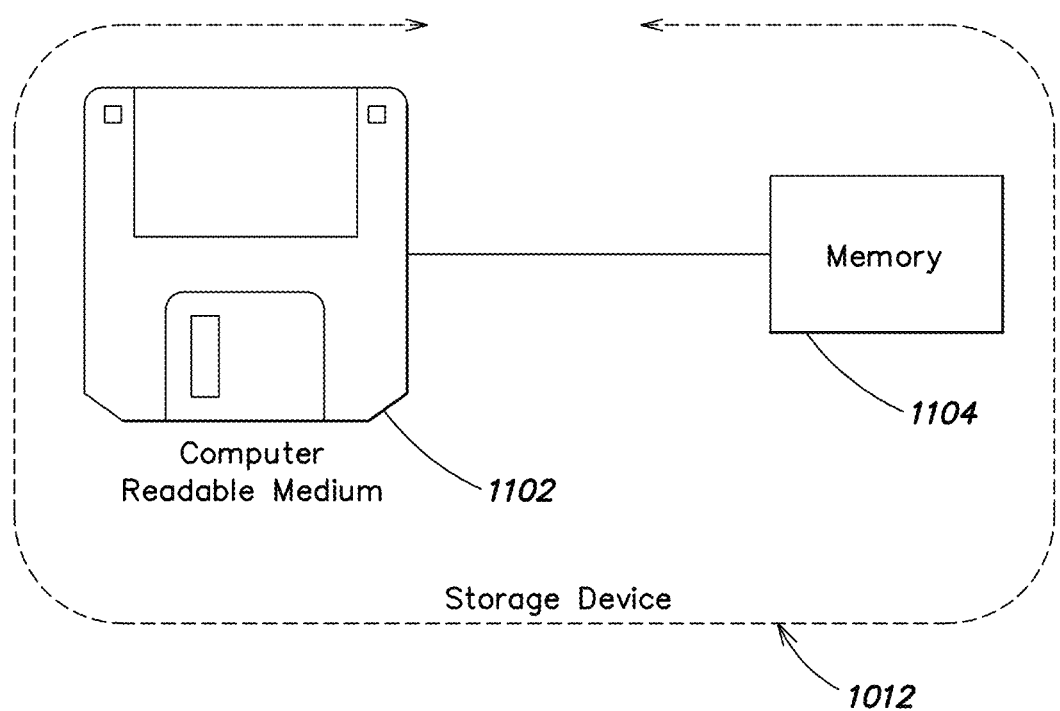
FIG. 11 is a block diagram of an example disk or flash memory, according to some embodiments.

The medium can, for example, be a disk 1102 or flash memory as shown in FIG. 11. Typically, in operation, the processor causes data to be read from the nonvolatile recording medium into another memory 1104 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 11, the memory can be located in storage 1112 as shown, or in memory system 1110. The processor 1106 generally manipulates the data within the memory 1110, and then copies the data to the medium associated with storage 1112 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 1100 is shown by way of example, as one type of computer system upon which various aspects of the invention can be practiced, it should be appreciated that aspects of the invention are not limited to being implemented on the computer system as shown in FIG. 11. Various aspects of the invention can be practiced on one or more computers having a different architectures or components than that shown in FIG. 11.

It should be appreciated that the invention is not limited to executing on any particular system or group of systems.

Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

A distributed system according to various aspects may include one or more specially configured special-purpose computer systems distributed among a network such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A distributed system comprising:
    at least one hardware processor operatively connected to a memory, the at least one hardware processor when executing configured to:
        manage a single logical database arranged as a replica set comprising:
            a primary source of data stored across an online database and an offline database managed by a primary node of the replica set, wherein the primary node provides a point of access to both the online and offline databases; and
            a secondary source of data storing archive copies of the data stored in the primary source, the secondary source being managed by a plurality of secondary nodes of the replica set; and
        a data processing entity, executed by the at least one hardware processor, adapted to receive a query of a single logical database;
    wherein the at least one hardware processor is configured to:
        monitor the online and the offline databases;
        determine at least one archive rule is met based on evaluation of at least a subset of data stored within the online database;
        transition, automatically, the subset of the data in the online database from the online database to the offline database by removing the subset of the data from the online database and adding the subset of the data to the offline database, and wherein the query is a single unified query that accesses and returns matching results from both of the online and offline databases for a respective query.

2. The system according to claim 1, wherein the online database comprises a data lake architecture adapted to store a plurality of unstructured data entities.

3. The system according to claim 1, wherein the data processing entity is configured to manage execution of the single unified query while the subset of data is undergoing the automatic transition between the online and offline database based on assigning a status to the data undergoing automatic transition.

4. The system according to claim 1, wherein the online database is stored within a cluster of nodes having at least a portion of the data stored according to a document based model and unstructured data architecture.

5. The system according to claim 1, wherein the offline database is stored within cloud-based storage entities stored according to at least a second data format.

6. The system according to claim 1, further comprising a processing entity configured to:
    create read-only views of storage comprising collections spanning the online database and the offline database;
    identify one or more queries consisting of read requests; and
    execute the unified query against the read-only views in response to identifying the one or more queries consisting of the read requests.

7. The system according to claim 1, wherein the data processing entity includes an archive management entity adapted to:
    receive a query from one or more systems and to distribute the query to one or more systems associated with the online database and offline database;
    evaluate a status associated with the subset of data as part of distribution of the query within the online and offline databases;
    determine at least a portion of the subset of data is hosted in the offline database and is subject to a write request; and
    update the status associated with at least the portion of the subset of data based on the received query and write request.

8. The system according to claim 1, further comprising a memory configured to store one or more archive rules that control archiving of data from the online database to the offline database.

9. The system according to claim 8, wherein the data processing entity is configured to:
    perform archiving operations in real time while performing database operations across the online database and offline database; and manage execution of the single unified query on data stored in the online database under a first format and transitioned data originally in the first format currently stored in the offline database under a second data format; and select a target collection from a plurality of offline versions having a common namespace in the offline database based on having an active status associated with the data stored in the target collection.

10. The system according to claim 8, wherein at least one of the one or more archive rules is configured to archive data based on a date field.

11. The system according to claim 8, wherein at least one of the one or more archive rules is configured to archive data based on a non-date field, the one or more archive rules including parameters defined on respective partitions having respective namespaces that include the non-date field as part of the namespace.

12. The system according to claim 8, wherein at least one of the one or more archive rules is configurable by a user.

13. The system according to claim 8, wherein at least one of the one or more archive rules is configured to archive data based on a plurality of data fields.

14. The system according to claim 1, wherein the offline database includes at least one partition defined by a namespace, the at least one partition including archive data determined by one or more data fields, and wherein a respective one of the at least one partition is specified and accessed based on the namespace and the one or more data fields.

15. The system according to claim 1, wherein the single unified query accesses and returns matching results from both of the online and offline databases by accessing and returning a single view of a union of both of the online and offline databases.

16. A method comprising:
managing a single logical database represented by a namespace arranged as a replica set comprising:
a primary source of data stored across an online database and an offline database managed by a primary node of the replica set; and
a secondary source of data storing archive copies of the data stored in the primary sources, the secondary source being managed by a plurality of secondary nodes of the replica set;
providing, using the primary node, a single integration point for performing one or more data operations on elements of the online and offline database wherein the single integration point connects a first application to the single logical database;
monitoring the online and offline databases;
determining at least one archive rule is met based on evaluation of at least a subset of data stored within the online database; and
transitioning, automatically, the subset of data in the online database from the online database to the offline database by removing the subset of the data from the online database and adding the subset of the data to the offline database; and
executing a single unified query on the data being stored across the online and offline databases received from the application via the single integration point wherein the single unified query accesses and returns matching results from both of the online and offline databases for a respective query.

17. The method according to claim 16, further comprising processing, by a database management entity, a write request that updates a data element located in offline storage, and determining if conditions for a transition of the data element from the offline storage to online storage are met.

18. The method according to claim 17, wherein the act of processing the write request includes unarchiving the data element to online storage.

19. A method comprising:
maintaining a single logical databased arranged as a replica set comprising:
a primary source of data stored across an online database and; maintaining an offline database managed by a primary node of the replica set, the primary node providing a point of access to both the online and offline databases; and
a secondary source of data storing archive copies of the data stored in the primary source, the secondary source being managed by a plurality of secondary nodes of the replica set;
providing a data processing entity adapted to receive a query of the single logical database;
monitoring the online and offline databases;
determining at least one archive rule is met based on evaluation of at least a subset of data stored within the online database;
transitioning, automatically, the subset of data in the online database from the online database to the offline database by removing the subset of the data from the online database and adding the subset of the data to the offline database; and
executing the query as a single unified query that accesses and returns matching results from both of the online and offline databases for a respective query.

20. The method according to claim 19, wherein the online database comprises at least a first data format including a document based model storing unstructured data, a second data format stored under a data lake architecture adapted to store a plurality of unstructured data entities, and a third data format of the offline database.

* * * * *